(12) United States Patent
Ishii (10) Patent No.: US 10,830,910 B2
(45) Date of Patent: Nov. 10, 2020

(54) RADIATION IMAGING APPARATUS, RADIATION IMAGING SYSTEM, CONTROL METHOD FOR RADIATION IMAGING APPARATUS, AND NON-TRANSITORY COMPUTER-READABLE STORAGE MEDIUM

(71) Applicant: CANON KABUSHIKI KAISHA, Tokyo (JP)

(72) Inventor: Yoshiaki Ishii, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 86 days.

(21) Appl. No.: 16/276,859

(22) Filed: Feb. 15, 2019

(65) Prior Publication Data
US 2019/0257956 A1  Aug. 22, 2019

(30) Foreign Application Priority Data

Feb. 21, 2018  (JP) ................................ 2018-029054

(51) Int. Cl.
| G01T 1/17 | (2006.01) |
| H04N 5/32 | (2006.01) |
| H04N 5/378 | (2011.01) |
| G01T 1/20 | (2006.01) |

(52) U.S. Cl.
CPC ............. *G01T 1/17* (2013.01); *G01T 1/2018* (2013.01); *H04N 5/32* (2013.01); *H04N 5/378* (2013.01)

(58) Field of Classification Search
CPC ........... G01T 1/17; G01T 1/2018; H04N 5/32; H04N 5/378

USPC ......................................................... 378/116
See application file for complete search history.

(56) References Cited

U.S. PATENT DOCUMENTS

| 9,833,214 | B2 | 12/2017 | Imamura | |
| 2009/0021607 | A1* | 1/2009 | Takenaka | G06T 5/002 |
| | | | | 348/231.99 |
| 2013/0182823 | A1* | 7/2013 | Kuwabara | A61B 6/4233 |
| | | | | 378/62 |
| 2013/0202086 | A1* | 8/2013 | Tsuji | G01T 1/02 |
| | | | | 378/62 |
| 2014/0084175 | A1* | 3/2014 | Ito | G01T 1/24 |
| | | | | 250/370.09 |
| 2015/0055752 | A1* | 2/2015 | Takahashi | H04N 5/32 |
| | | | | 378/62 |

(Continued)

FOREIGN PATENT DOCUMENTS

JP  2014-071033 A  4/2014

*Primary Examiner* — Taeho Jo
(74) *Attorney, Agent, or Firm* — Venable LLP (57) ABSTRACT

A radiation imaging apparatus is provided. The apparatus comprises pixels that configure a plurality of rows and a plurality of columns and are configured to obtain a radiation image, and a readout unit configured to readout signals from the pixels. The readout unit reads out a signal from pixels simultaneously selected, out of the pixels, in accordance with a row selection line connected in common for each row. In a case where a first pixel for detecting an incident dose during capturing of a radiation image that is set from the pixels is a defective pixel, the readout unit reads out a signal for detecting an incident dose from a second pixel selected from the pixels so that at least one row is arranged between the row that includes the first pixel and a row that includes the second pixel.

12 Claims, 5 Drawing Sheets

(56) References Cited

U.S. PATENT DOCUMENTS

| | | | |
|---|---|---|---|
| 2015/0153464 A1* | 6/2015 | Imamura | H01L 27/14605 378/207 |
| 2015/0164458 A1* | 6/2015 | Tajima | H05G 1/44 378/97 |
| 2015/0182182 A1* | 7/2015 | Tajima | A61B 6/542 378/189 |
| 2015/0297167 A1* | 10/2015 | Tsuji | G01T 1/02 378/97 |
| 2015/0326810 A1* | 11/2015 | Okada | H01L 27/14658 378/98.2 |
| 2016/0252630 A1* | 9/2016 | Okada | H04N 5/32 250/366 |
| 2018/0308233 A1* | 10/2018 | Machida | A61B 6/481 |

* cited by examiner

RADIATION IMAGING APPARATUS, RADIATION IMAGING SYSTEM, CONTROL METHOD FOR RADIATION IMAGING APPARATUS, AND NON-TRANSITORY COMPUTER-READABLE STORAGE MEDIUM

BACKGROUND OF THE INVENTION

Field of the Invention

The present invention relates to a radiation imaging apparatus, a radiation imaging system, a control method for a radiation imaging apparatus, and a non-transitory computer-readable storage medium.

Description of the Related Art

In medical imaging diagnosis or non-destructive inspection, radiation imaging apparatuses that use a flat plane detector (FPD) configured by a semiconductor material are widely used. In such radiation imaging apparatuses, monitoring radiation incident on the radiation imaging apparatus is known. By detecting a radiation dose in real-time, it is possible to detect the start and end of the radiation irradiation and perform automatic exposure control (AEC) to ascertain an integrated dose of the radiation that is incident during the radiation irradiation.

SUMMARY OF THE INVENTION

In a case where a defective pixel whose outputted signal value greatly differs in comparison to other pixels is included in pixels used for AEC, it is possible for the accuracy of the AEC to decrease due to the influence of the defective pixel. Japanese Patent Laid-Open No. 2014-71033 describes performing AEC using a dose detection pixel arranged separately from pixels for generating a radiation image. In Japanese Patent Laid-Open No. 2014-71033, in a case if performing AEC based on signal values for each block of a plurality of organized blocks that respectively include a dose detection pixel, and the dose detection pixels used in AEC include a defective pixel, the influence of the defective pixel on AEC is reduced by reorganizing the blocks.

However, there are cases where some pixels for generating a radiation image are used for AEC. Because, at a time of AEC, a signal is read for a row in which a pixel used in AEC is arranged, there are cases where this row cannot be used to generate a radiation image. In addition, when generating a radiation image, a signal from a defective pixel may be corrected by using a signal from pixels surrounding the defective pixel. Accordingly, if a pixel used in AEC is a defective pixel, it is necessary to change the pixels used in AEC while considering correction of the defective pixel in order to generate a radiation image.

Some embodiments of the present invention provide a technique for, when some pixels for generating a radiation image are used for AEC and if a pixel used for AEC is a defective pixel, changing the pixels used for AEC while suppressing an influence on accuracy of correction of the defective pixel when the radiation image is generated.

According to some embodiments, a radiation imaging apparatus comprising a plurality of pixels that configure a plurality of rows and a plurality of columns and are configured to obtain a radiation image; and a readout unit configured to readout signals from the plurality of pixels, wherein the readout unit reads out a signal from pixels simultaneously selected, out of the plurality of pixels, in accordance with a row selection line connected in common for each row, and in a case where a first pixel for detecting an incident dose during capturing of a radiation image that is set from the plurality of pixels is a defective pixel, reads out a signal for detecting an incident dose from, instead of the first pixel, a second pixel selected from the plurality of pixels so that at least one row is arranged between the row that includes the first pixel and a row that includes the second pixel, is provided.

According to some other embodiment, a control method for a radiation imaging apparatus comprising a plurality of pixels that configure a plurality of rows and a plurality of columns and are configured to obtain a radiation image; and a readout unit configured to readout signals from the plurality of pixels, the readout unit simultaneously reading out signals for pixels, out of the plurality of pixels, connected to a common row selection line for each row, the method comprising: determining whether a first pixel, set out of the plurality of pixels, for detecting an incident dose during capturing of the radiation image is a defective pixel; and if it is determined that the first pixel is a defective pixel, reading out, by the readout unit, a signal for detecting an incident dose from, instead of the first pixel, a second pixel selected out of the plurality of pixels so that at least one row is arranged between a row that includes the first pixel and a row that includes the second pixel, is provided.

According to still other embodiments, a non-transitory computer-readable storage medium storing a program for causing a computer to execute a control method for a radiation imaging apparatus comprising a plurality of pixels that configure a plurality of rows and a plurality of columns and are configured to obtain a radiation image; and a readout unit configured to readout signals from the plurality of pixels, the readout unit simultaneously reading out signals for pixels, out of the plurality of pixels, connected to a common row selection line for each row, the method comprising: determining whether a first pixel, set out of the plurality of pixels, for detecting an incident dose during capturing of the radiation image is a defective pixel; and if it is determined that the first pixel is a defective pixel, reading out, by the readout unit, a signal for detecting an incident dose from, instead of the first pixel, a second pixel selected out of the plurality of pixels so that at least one row is arranged between a row that includes the first pixel and a row that includes the second pixel, is provided.

Further features of the present invention will become apparent from the following description of exemplary embodiments with reference to the attached drawings.

DESCRIPTION OF THE EMBODIMENTS

Description is given below, with reference to the attached drawings, of concrete embodiments of a radiation imaging system according to the present invention. In the following description and drawings, common reference numerals denote common components throughout a plurality of drawings. Hence, the common components will be described by making cross-references to the plurality of drawings, and a description of components denoted by common reference numerals will be appropriately omitted. In addition, radiation according to the present invention can include not only α-rays, β-rays, and γ-rays that are beams generated by particles (including photons) emitted by radioactive decay but also beams having equal or more energy, for example, X-rays, particle rays, and cosmic rays.

Figure 1A:
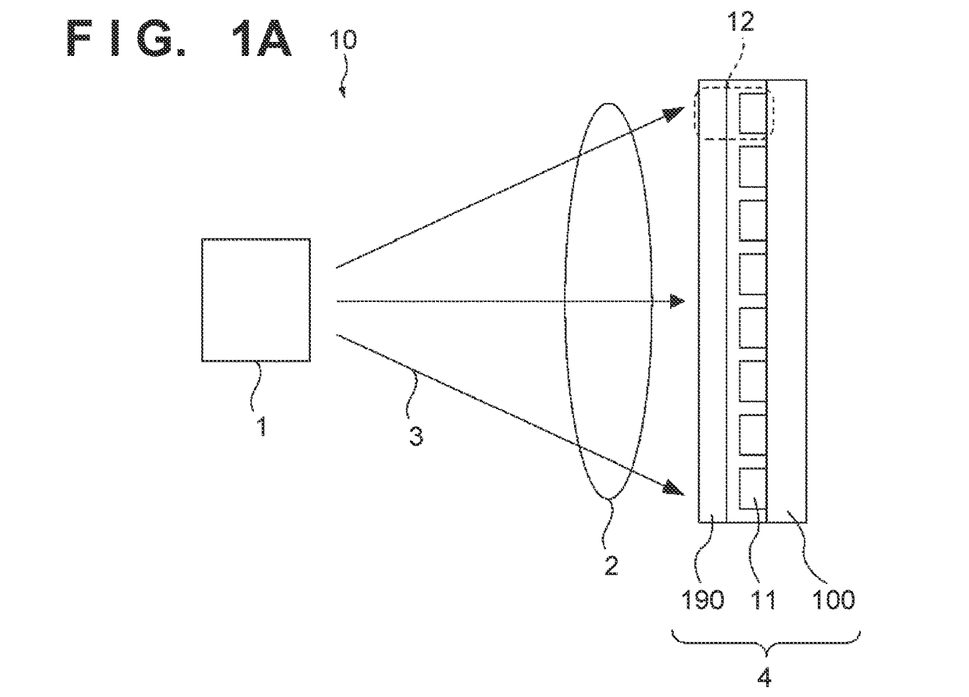
FIGS. 1A and 1B are views illustrating example configurations of a radiation imaging system that uses a radiation imaging apparatus according to an embodiment of the present invention.

With reference to FIGS. 1A to 5D, description is given for a configuration and operation of a radiation imaging apparatus 4 according to an embodiment of the present invention. FIGS. 1A and 1B are schematic views illustrating example configurations of a radiation imaging system 10 that uses the radiation imaging apparatus 4 according to an embodiment of the present invention. The radiation imaging system 10 includes a radiation source 1 for emitting radiation 3 onto the radiation imaging apparatus 4, and the radiation imaging apparatus 4. The radiation 3 emitted from the radiation source 1 passes through a subject 2, and is incident on the radiation imaging apparatus 4.

Figure 1B:
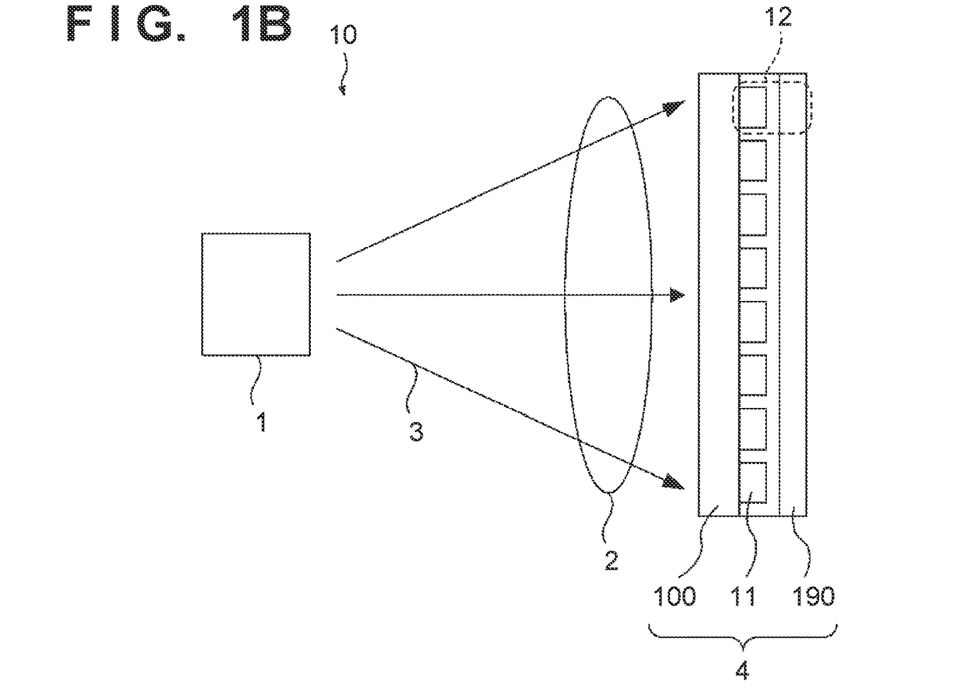

The radiation imaging apparatus 4 includes a substrate 100, and a plurality of pixels 11 arranged two-dimensionally to configure a plurality of rows and a plurality of columns that are arranged on the substrate 100, and a scintillator 190. The scintillator 190 converts radiation to light such as visible light. A pixel 11 includes a photoelectric conversion element such as a photodiode, for example, and performs a photoelectric conversion on light converted from radiation by the scintillator 190. A conversion element 12 for converting radiation into an electric signal is configured by a pixel 11 and the scintillator 190. The scintillator 190 may be shared by a plurality of conversion elements 12, as illustrated in FIGS. 1A and 1B.

With the configuration illustrated in FIG. 1A, the scintillator 190 is arranged on a side further from the radiation source 1 than the substrate 100. With the configuration illustrated in FIG. 1B, the substrate 100 rather than the scintillator 190 faces the radiation source 1, and the radiation 3 is incident on the scintillator 190 after passing through the substrate 100 and the plurality of pixels 11. Radiation incident on the scintillator 190 is converted to light, and the pixels 11 generate electric signals in accordance with this light. In this way, in the present embodiment, the radiation imaging apparatus 4 may be a front-side irradiation radiation imaging apparatus as illustrated by FIG. 1A, and may be a back-side irradiation radiation imaging apparatus as illustrated by FIG. 1B. In addition, with the configurations illustrated in FIGS. 1A and 1B, when later-described automatic exposure control (AEC) is performed, the radiation imaging apparatus 4 and the radiation source 1 (or a radiation source control unit that controls the radiation source 1) communicate wirelessly. However, there is no limitation to this, and communication between the radiation imaging apparatus 4 and the radiation source 1 may be performed by wire.

Figure 2:
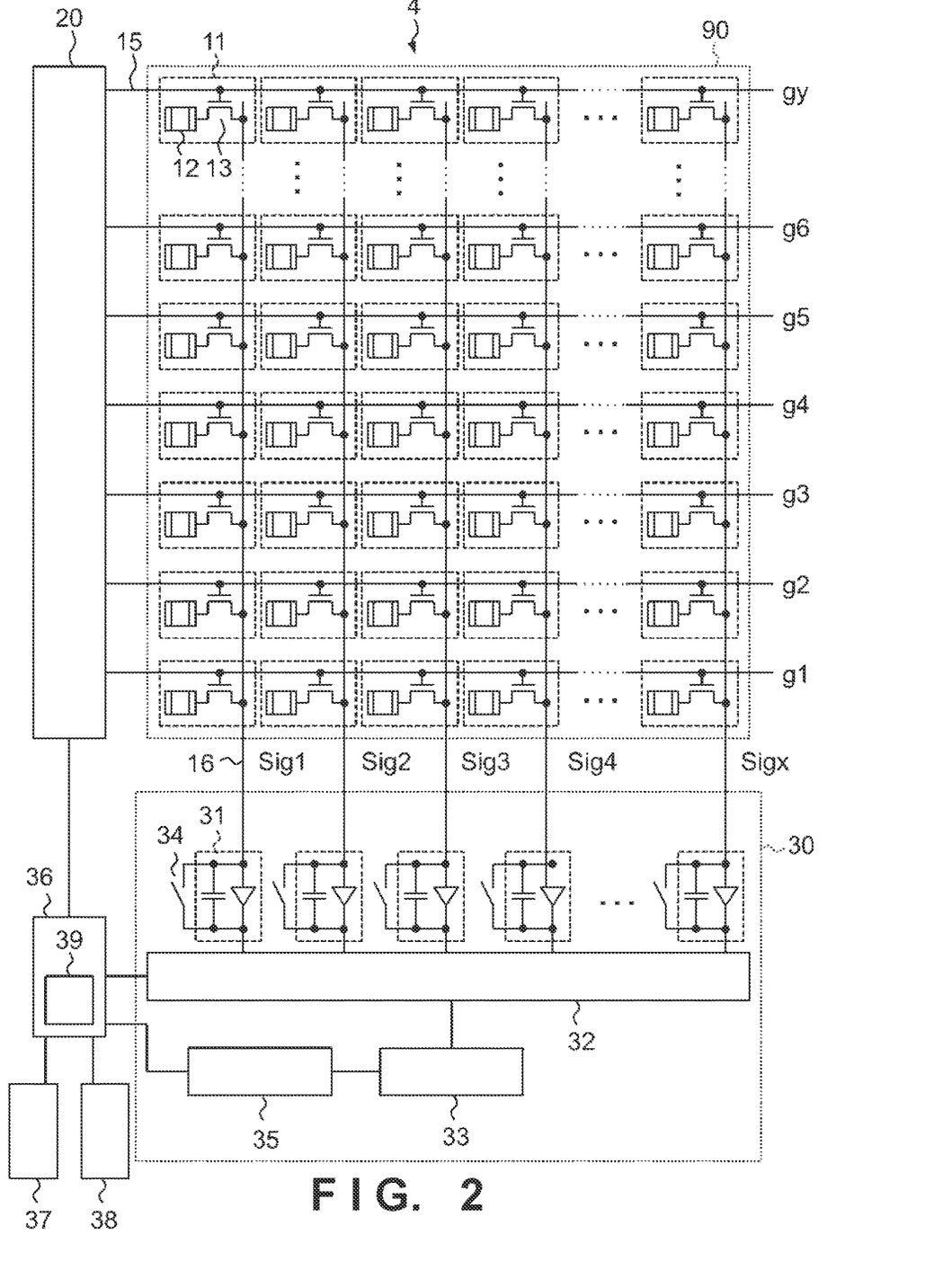
FIG. 2 is a view for illustrating an example configuration of the radiation imaging apparatus of FIGS. 1A and 1B.

Next, FIG. 2 is used to give a description of a configuration of the radiation imaging apparatus 4. The radiation imaging apparatus 4 comprises the plurality of pixels 11, a row selection unit 20, a processing unit 30, a control unit 36, and a communication unit 37.

As described above, the pixels 11 are arranged in a two-dimensional array so as to configure a plurality of rows and a plurality of columns, and configure an imaging region 90. Each pixel 11 includes a conversion element 12 for converting radiation to an electric signal, and a switching element 13. The conversion element 12 may be configured by a photoelectric conversion element and a scintillator as described above, and may be configured by an element for directly converting radiation to an electric signal. The conversion element 12 includes a first electrode (may be referred to as a discrete electrode or a readout electrode), and a second electrode (may be referred to as a common electrode). The first electrodes are connected to a column signal line 16 (Sig1 column to Sigx column) via the switching element 13. The second electrodes are connected to a bias line (not shown) for providing a bias potential to the conversion element 12.

In accordance with the control unit 36, the row selection unit 20 drives, to an active level, a row selection line 15 for a row to select out of a plurality of row selection lines 15 (g1 row to gy row). By this, from among the plurality of pixels 11 that configure the imaging region 90, pixels 11 connected to a row selection line 15 shared by a respective row are selected simultaneously. When a row selection line 15 becomes the active level, the switching elements 13 of the pixels 11 connected to the row selection line 15 turn on, the first electrodes of the conversion elements 12 of the pixels 11 connected to the shared row selection line are connected to column signal lines 16, and signals are read out by respectively corresponding column signal lines 16.

The processing unit 30 includes amplifiers 31, a multiplexer 32, an A/D convertor 33, reset switches 34, and a calculation unit 35, and operates in accordance with the control unit 36. The amplifiers 31 detect (amplify) signals outputted to the column signal lines 16. The amplifiers 31 may be integration amplifiers, for example. In the present embodiment, a plurality of amplifiers 31 are provided so that one column signal line 16 corresponds to one amplifier 31. A reset switch 34 resets an amplifier 31 by shorting input terminal and an output terminal of the amplifier 31, and also resets the potential of a column signal line 16.

The multiplexer 32 selects from the plurality of amplifiers 31 in order, and outputs the output of a selected amplifier 31 to the A/D convertor 33. The A/D convertor 33 converts a signal (an analog signal) outputted from the multiplexer 32 into a digital signal. The calculation unit 35 processes a signal outputted from the A/D convertor 33, and outputs a processed result. The calculation unit 35 may output a signal outputted from the A/D convertor 33 unchanged. The calculation unit 35 can process a signal outputted from the A/D convertor 33 before radiation irradiation and after irradiation.

The control unit 36 controls the row selection unit 20 and the processing unit 30 to thereby control capturing of a radiation image in the radiation imaging apparatus 4. In addition, the row selection unit 20 and the processing unit 30 cooperate in accordance with the control unit 36 to thereby function as a readout unit. Accordingly, description of a readout unit below indicates the row selection unit 20 and the processing unit 30.

The communication unit 37 performs communication to synchronize the radiation source 1 and the radiation imaging apparatus 4. In addition, the communication unit 37 outputs image data of a radiation image captured by the radiation imaging apparatus 4 to a unit external to the radiation imaging apparatus 4. For example, the communication unit 37 outputs image data to a display apparatus (not shown) for a user (a doctor, radiographer, or the like) to confirm a radiation image. As described above, the communication unit 37 may perform wireless communication, and may perform wired communication.

Figure 3A:
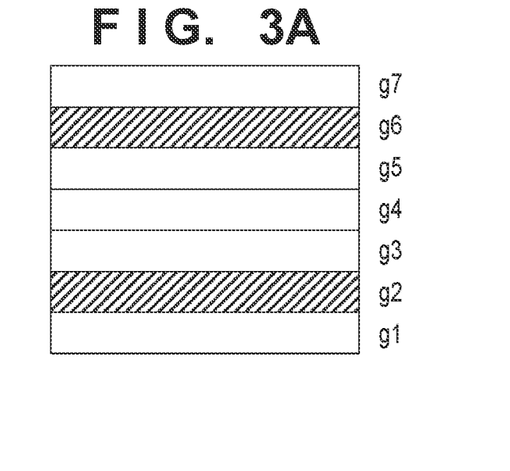
FIGS. 3A and 3B are views for illustrating operation of the radiation imaging apparatus of FIGS. 1A and 1B.
Figure 3B:
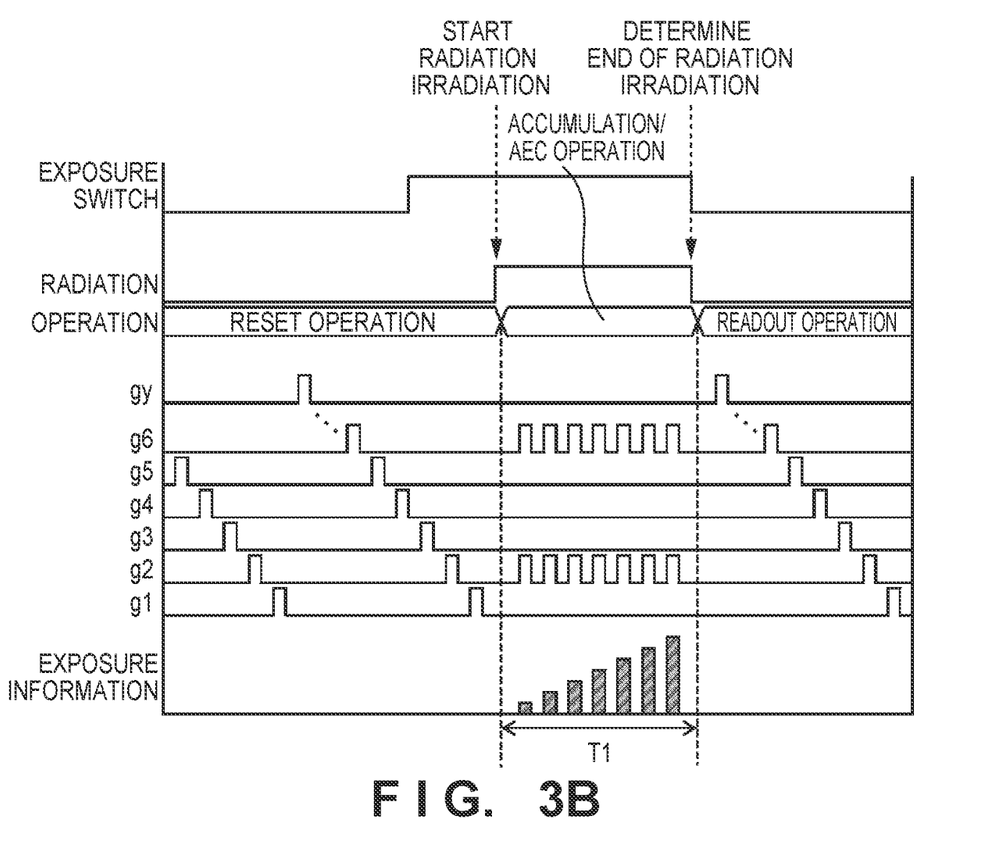

Next, description is given regarding operation of the radiation imaging apparatus 4 in the present embodiment. FIGS. 3A and 3B are views for describing operation in the radiation imaging apparatus 4, in a case of ascertaining an integrated dose (an incident dose) of radiation that is incident during the radiation irradiation, and performing AEC (may be referred to as an AEC operation below).

FIG. 3A illustrates an example of arranging a dose measurement row for detecting an incident dose of incident radiation, in the imaging region 90. In the present embodiment, an incident dose is detected by pixels 11 arranged in a g2 row and a g6 row, as illustrated in FIG. 3A.

FIG. 3B illustrates timings of an AEC operation and readout operations for reading out signals that have been changed from radiation and have accumulated in pixels 11, in the present embodiment. Firstly, in a duration until radiation is emitted, the control unit 36 causes the row selection unit 20 to sequentially activate the row selection lines 15 (g1 row through gy row), causes the switching elements 13 of the pixels 11 to turn on, and performs a reset operation for resetting each pixel 11. Because a semiconductor element is mainly used for a conversion element 12 of a pixel 11, charge (a dark charge) due to heat occurs. Accordingly, if a switching element 13 is always set to a non-conductive state, charge accumulates in parasitic capacitance or the like of the conversion element 12. In a case where radiation irradiation is started and capturing of a radiation image is performed while dark charge is accumulated, a signal due to the dark charge will overlap with a signal generated by the radiation being incident on the pixel 11, and image quality of the radiation image will decrease. In order to suppress this decrease of image quality of a radiation image due to dark charge, a reset operation is performed before radiation irradiation. For pixels of a large radiation imaging apparatus, a photoelectric conversion element formed by, for example, amorphous silicon or silicon nitride on an insulating substrate such as glass is often used. For example, a MIS or PIN photodiode is used for the photoelectric conversion element, but it is easy for a photoelectric conversion element formed by such material to generate a dark charge, due to characteristics of the material. Accordingly, a reset operation for the pixels 11 as illustrated by FIG. 3B is necessary before radiation is emitted.

Next, when a user presses an exposure switch for emitting radiation, radiation is emitted from the radiation source 1 after the reset operation for each of the pixels 11 of the radiation imaging apparatus 4 has completed. Synchronization between the radiation source 1 and the radiation imaging apparatus 4 is performed via the communication unit 37.

When radiation irradiation is started, the control unit 36 causes the row selection unit 20 to deactivate row selection lines 15 other than those for dose measurement rows, and activate the row selection lines 15 for the dose measurement rows. By this, the radiation imaging apparatus 4 measures the radiation dose emitted onto the imaging region 90 during the radiation irradiation.

A time period for measuring an incident dose is a time period T1 illustrated in FIG. 3B. In this measurement time period, the control unit 36 causes a plurality of row selection lines 15 to be set to active simultaneously, and reads out the signals that have accumulated in the pixels 11 of the selected rows (in the present embodiment, the g2 row and the g6 row). By causing signals from a plurality of pixels 11 to be output to the same column signal line 16 simultaneously, an amount of time for reading out signals from the plurality of pixels 11 to detect the incident dose is shortened, and responsiveness of the AEC operation can be improved.

When an integrated amount of the signals read out from the pixels 11 of the rows selected by the processing unit 30 reaches a preset signal amount, the control unit 36 sends a signal for stopping radiation irradiation to the radiation source 1 via the communication unit 37. The radiation source 1 stops radiation irradiation in accordance with the signal for stopping radiation irradiation.

After radiation irradiation is stopped, a readout operation is performed. In the readout operation, the control unit 36 causes the row selection unit 20 to sequentially activate the row selection lines 15. By this, the switching elements 13 of the pixels 11 which are connected to an activated shared row selection line 15 turn on, and charge that has accumulated in the conversion elements 12 is transferred to the amplifiers 31 via the column signal lines 16. The transferred charge is converted to voltage which is sent to the A/D convertor 33 and converted to the digital data, and then this becomes image data by the calculation unit 35, and is outputted from the radiation imaging apparatus 4.

Here, pixels 11 used to detect an incident dose during an AEC operation are set in advance by a user or the like. In addition, configuration may be taken such that, for example, the radiation imaging apparatus 4 or the radiation imaging system 10 further includes a detection unit for detecting a position of a subject, and the pixels 11 to use for detecting the incident dose are set thereby. For selection of rows for causing output of signals from the set pixels 11, the control unit 36, in accordance with the set pixels 11, causes the row selection unit 20 to operate, as described above. In addition, for a column direction, the calculation unit 35 may calculate signals of the set pixels 11 out of signals that have been read out. For example, configuration may be taken such that a user inputs information of pixels 11 to use to detect an incident dose from an input apparatus such as a GUI (Graphical User Interface), and the control unit 36 controls the row selection unit 20 and the processing unit 30 in accordance with the inputted information.

Figure 4A:
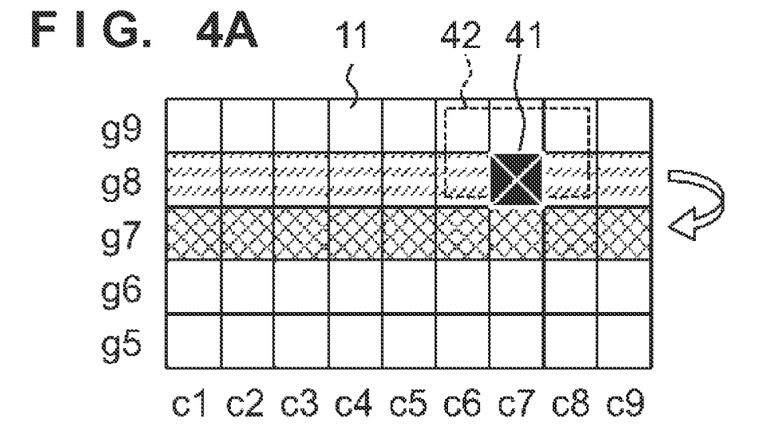
FIGS. 4A and 4B are views for illustrating a method of selecting a row for performing dose measurement of the radiation imaging apparatus of FIGS. 1A and 1B.
Figure 4B:
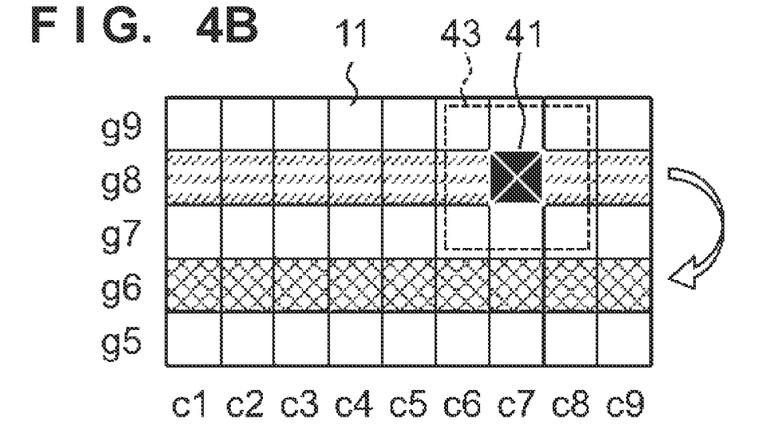

Next, using FIGS. 4A and 4B, description is given for a method of changing pixels used for AEC in a case where a pixel 11 used in AEC is a defective pixel whose outputted signal value greatly differs in comparison to other pixels 11. Here, description is given regarding a case where the g8 row is read out as a dose measurement row, and a preset pixel 11 for detecting an incident dose is a defective pixel 41 arranged at a position g8c7.

Here, the radiation imaging apparatus 4 is provided with a storage unit 38 for storing the arrangement of the defective pixel 41 out of the plurality of pixels 11, and the arrangement of the defective pixel 41 may be stored in the storage unit 38. If a pixel 11 selected for detecting an incident dose during imaging of a radiation image is the defective pixel 41 that is stored in the storage unit 38, the control unit 36 causes the readout unit to read out a signal for detecting the incident dose from a different pixel 11 selected by a later-described method, instead of the defective pixel 41. In other words, the control unit 36 determines whether a pixel 11, which is for detecting a dose that is incident during capturing of a radiation image and is set from out of the plurality of pixels 11, is a defective pixel 41. Configuration may be taken such that the defective pixel 41 is derived by an inspection before factory shipping, for example, and an arrangement of the defective pixel 41 is stored in the storage unit 38. In addition, for example, the radiation imaging apparatus 4 may further include a determination unit 39 for determining whether each of the plurality of pixels 11 is a defective pixel, and the determination unit 39 causes the storage unit 38 to store an arrangement of a pixel 11 determined to be a defective pixel 41 out of the plurality of pixels 11. In this case, for example, the determination unit 39 may extract a defective pixel 41 using a signal outputted from each pixel 11 after the radiation irradiation by a predetermined condition before a radiation image is captured. In addition, for example, at a time of activation of the radiation imaging apparatus 4 or while a reset operation is being performed, the determination unit 39 may determine that a pixel which outputs a signal that is considerably different to other pixels is a defective pixel 41.

Next, description is given regarding a signal at the position of the defective pixel 41 when image data of a radiation image is being generated. A signal output from the defective pixel 41 cannot be used for image data, and thus is typically corrected using information of pixels 11 in the periphery of the defective pixel 41. For example, an average value of signals of eight pixels 11 surrounding the defective pixel 41 may be set as the output value of the defective pixel 41. In addition, for example, a value calculated by applying an appropriate weighting to signals of eight pixels surrounding a defective pixel 41 may be set as the output value of the defective pixel 41. Correction of a defective pixel 41 is not limited to correction using eight pixels surrounding the defective pixel 41, and a number or region of pixels to use may be variable.

Using FIG. 4A, description is given regarding a case of detecting an incident dose using pixels 11 of a row adjacent to a set dose measurement row. In other words, in FIG. 4A, this is the case in which, in order to avoid the defective pixel 41 at the position g8c7 which was set to detect an incident dose, the control unit 36 has selected the adjacent g7 row as a dose measurement row.

Signals of the pixels 11 of the dose measurement row are read out during an AEC operation as illustrated by FIG. 3B. Accordingly, the values of the signals read out at the time of the readout operation may different to values in a case where an accumulation operation was performed during an AEC operation in order to obtain a radiation image. Accordingly, it is possible that the signals of respective pixel 11 arranged in the dose measurement row cannot be used as image data. Accordingly, when a row adjacent to the defective pixel 41 is set as a dose measurement row, the pixels 11 used for correction of the defective pixel 41 are the five pixels 11 indicated by a range 42. In case of correcting by using the pixels 11 of the range 42, it is possible that the accuracy of the correction will be lower because the number of signals of the pixels 11 that can be used is fewer than in the case where the 8 surrounding pixels 11 are used. In addition, in a case of the configuration illustrated in FIG. 4A, it is not possible to refer to signals of the pixels 11 arranged below the position of the defective pixel 41 in the drawing, and thus a corrected signal value inevitably tends toward the signal values of the pixels 11 arranged upward of the position of the defective pixel 41. Signal correction becomes necessary for each pixel 11 included in the dose measurement row (the g7 row), in addition to the defective pixel 41. In a case where the dose measurement row is moved to a row adjacent to the defective pixel 41, the pixels 11 that need correction, such as the defective pixel 41 and each pixel 11 of a dose measurement row, may be contiguous on a generated radiation image. In such a case, the accuracy of correction will decrease, as described above.

Accordingly, in the present embodiment, if a set pixel 11 for detecting an incident dose during capturing of a radiation image, from among the plurality of pixels 11, is a defective pixel 41, the control unit 36 does not select a row adjacent to the defective pixel 41 as a dose measurement row. Specifically, the control unit 36 controls the readout unit to read out signals for detecting an incident dose from a pixel 11 selected so that at least one row is arranged between the row from which the readout unit reads out a signal, and the row in which the defective pixel 41 is included, from among the plurality of pixels 11. In the configuration illustrated in FIG. 4B, the control unit 36 leaves one row from the defective pixel 41 open, and sets the g6 row as the new dose measurement row in order to avoid the defective pixel 41 at the position g8c7 which was set to detect the incident dose. In addition, in such a case, the control unit 36 may set the pixel 11 at the position g6c7, which outputs a signal to a column signal line 16 in common with that for the defective pixel 41, as the pixel for detecting an incident dose. By selecting a pixel 11 that outputs a signal to the same column signal line 16 as that for the defective pixel 41, the control unit 36 changes, from among the readout unit, only the operation of the row selection unit 20 and does not need to change operation of the processing unit 30. By changing a pixel 11 for detecting an incident dose in this way, it is possible to use all eight pixels 11 that surround the defective pixel 41 and are indicated by the range 43, as pixels 11 for correcting the signal of the defective pixel 41. In addition, for the pixel 11 at the position g6c7 for detecting an incident dose, it is possible to perform a correction using signals of a total of six pixels 11 (for the positions g5c6 to g5c8, and the positions g7c6 to g7c8), that is, three pixels for each of above and below the g6 row.

In the present embodiment, a new dose measurement row is selected by leaving a space of one row from a dose measurement row that was set in advance, but the number of rows arranged in between is not limited to one row, and may be two or more. In the configuration illustrated in FIG. 4B, in a case of correcting the defective pixel 41 and the pixel 11 at the position g6c7 of the dose measurement row, signals for the three pixels 11 at the positions g7c6 to g7c8 are used for correction of both the defective pixel 41 and the pixel 11 at the position g6c7. In such a case, for example, by setting a moved dose measurement row to the g5 row and opening two rows from the g8 row where the dose measurement row was previously set, correction of the signals of the defective pixel 41 and the pixel 11 at the position g5c7 that is newly set to detect the incident dose ceases to use the signals of the same pixels 11 therebetween. Accordingly, it is possible to perform correction more evenly.

In the configuration illustrated in FIG. 4B, description was given regarding a point defect (the defective pixel 41), but a target defect is not limited to this. For example, a defect may be a linear form along one horizontal row or one vertical column. In addition, a movement destination of a dose measurement row may be selectively decided in accordance with a shape or a factor (for example, an open circuit for a signal line) of a defect, or the state of the movement destination row.

In addition, configuration may be taken to, when a plurality of dose measurement rows are set in an AEC operation, change only the position of a dose measurement row having a pixel 11 for detecting an incident dose that is a defective pixel 41. Description is given for such a case with reference to FIG. 3A. Firstly, the dose measurement row is selected so that a signal for detecting an incident dose is read from a pixel 11 of a row (for example the g6 row) arranged at least one row away from a row (for example the g2 row) that includes a pixel 11 that is set to detect the incident dose. For a pixel 11 of a dose measurement row, it is difficult to obtain a signal for generating a radiation image, as described above. If a plurality of dose measurement rows are adjacent to one another, the accuracy for correcting the pixels 11 included in the dose measurement rows will decrease. Accordingly, at least one row is arranged between dose measurement rows. In addition, if a pixel 11 for detecting an incident dose of the g2 row is a defective pixel 41, for example, the g4 row is set as a dose measurement row, and a pixel 11 included in the g4 row is used for detection of the incident dose. In other words, the control unit 36 selects the pixels 11 (a dose measurement row) so that at least one row is arranged between the g4 row that was changed to include a pixel 11 for incident dose detection, and the g6 row was preset to include a pixel 11 for incident dose detection. By setting in this way, even if the set pixel 11 for detecting an incident dose is a defective pixel 41, it is possible to change a pixel 11 used in AEC while suppressing an influence accuracy of a correction of the defective pixel when generating a radiation image. In such a case, the incident dose detection pixel 11 of the g4 row that was changed to and the incident dose detection pixel 11 of the g6 row that was preset may be pixels 11 that output signals to a common column signal line 16.

In addition, if a plurality of dose measurement rows are set in an AEC operation, there is no limitation to moving only a dose measurement row that includes a defective pixel 41. For example, configuration may be taken to change all dose measurement rows set for the imaging region 90, and not just a specific dose measurement row, while aligning directions and movement amounts for all of the moved dose measurement rows.

In addition, in the present embodiment, while the dose measurement row was moved downward in the drawing with respect to the defective pixel 41, the movement direction is not limited to this. For example, the dose measurement row may be moved upward in the drawing. In addition, in FIG. 4B, if the pixel 11 at the position g6c7, to which a change was made in order to detect the incident dose, is a defective pixel 41, the readout unit may read out a signal for detecting the incident dose from a pixel 11 included in the same g6 row as the pixel 11 at the position g6c7. In such a case, for example, the pixel 11 at the position g6c6 is selected as a pixel for detecting the incident dose.

Next, using FIGS. 5A through 5D, description is given regarding a case in which signals outputted from a plurality of pixels 11 are added together and used as one pixel for a radiation image. In other words, this is case where signals are simultaneously read out from a pixel group of n mutually adjacent rows (n is an integer greater than or equal to 2), to generate an image data signal.

Figure 5A:
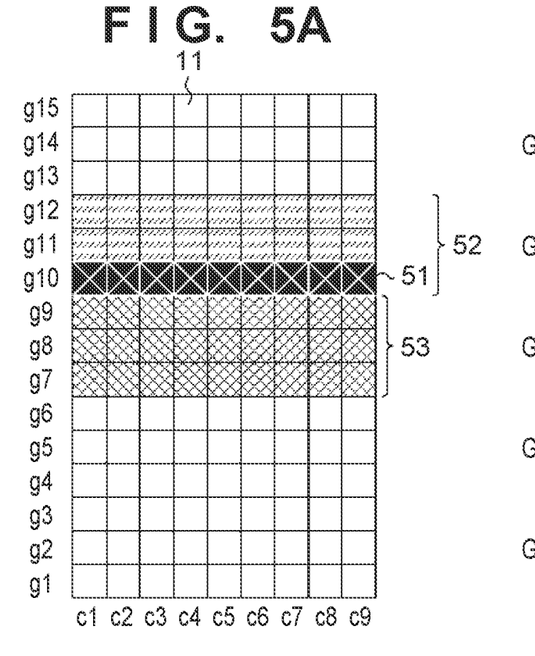
FIGS. 5A through 5D are views for illustrating a method of selecting a row for performing dose measurement of the radiation imaging apparatus of FIGS. 1A and 1B.
Figure 5B:
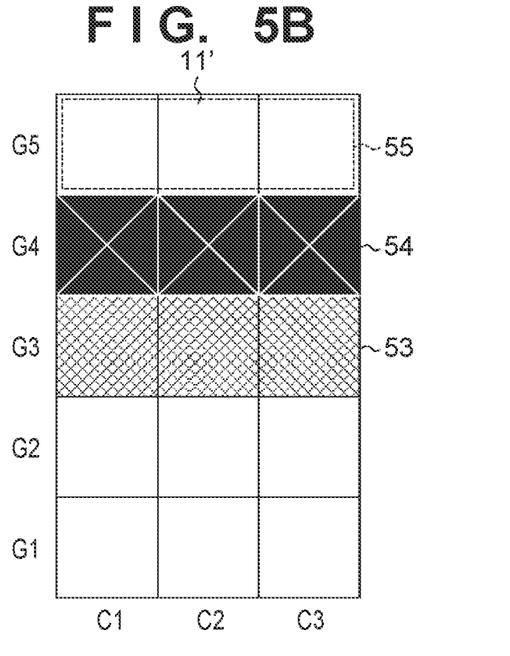

FIGS. 5A through 5D are views for describing change of a dose measurement row in a case where n=3, and indicate an example of adding together 3 horizontal by 3 vertical pixels 11. Here, a case where a plurality of defective pixels 51 are arranged linearly in a dose measurement row is assumed. FIG. 5A illustrates a case where there is a linear defect in a g10 row out of a pixel group 52 of dose measurement rows (g10 row to g12 row). In addition, FIG. 5B illustrates pixels 11' after respective 3 horizontal pixel by 3 vertical pixel groups of FIG. 5A are added together one at a time. Specifically, pixels 11 at the positions g1c1 to g3c3 of FIG. 5A are added together to give the pixel 11' at position G1C1 of FIG. 5B.

As indicated by FIG. 5B, if the defective pixels 51 are used in this addition, a pixel group 54 after the addition may behave as defective pixels. Accordingly, if the pixel group 54 that includes the defective pixels 51 is used in AEC, it is possible for the accuracy of AEC to decrease. As described above, a case of changing the dose measurement row from the g10 row which includes the defective pixels 51 to the g8 row which sandwiches the g9 row therebetween, and performing AEC by using the pixels 11 of the g8 row, the g11 row, and the g12 row is considered. In this case, with the image data after addition of FIG. 5B, two rows needing correction will contiguously occur: the G3 row and the G4 row, and correction accuracy will decrease. In addition, even if the dose measurement rows are set as the pixel group 53 for the g7 row through the g9 row for example, in the image data after addition, two rows needing correction will occur contiguously: the G3 row and the G4 row, and the correction accuracy will decrease.

Accordingly, in a case of simultaneously reading out signals from pixel group of n mutually adjacent rows, the readout unit, in accordance with the control unit 36, selects the incident dose detection pixels so that n×m$_1$ rows (m$_1$ is a positive integer) are arranged between the preset pixel group that includes the defective pixels 51 and the newly selected pixel group that includes pixels for detecting the incident dose. A specific description is given using FIGS. 5C and 5D. Description is given by taking a case where n=3 as an example, similarly to FIGS. 5A and 5B.

Figure 5C:
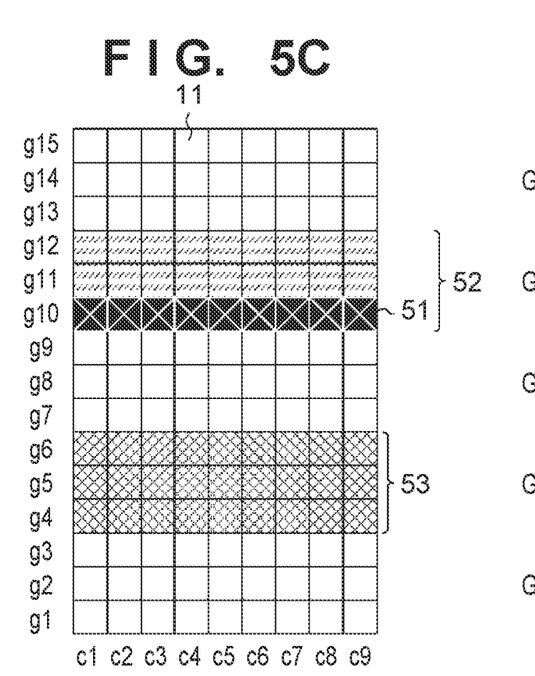
Figure 5D:
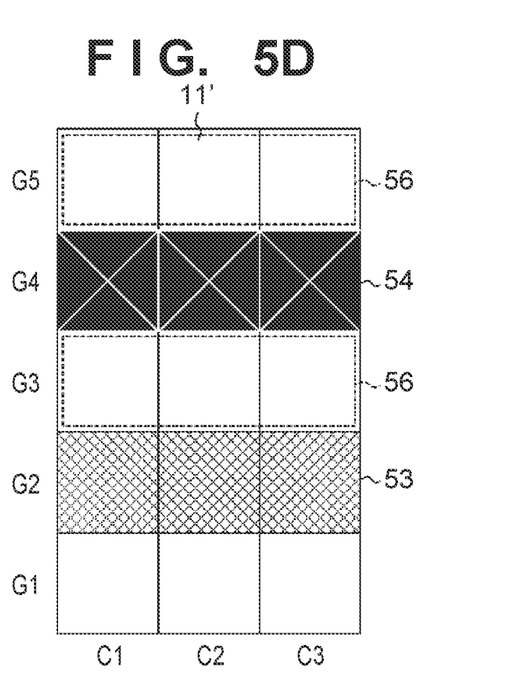

As illustrated by FIG. 5C, the defective pixels 51 are linearly present in the g10 row out of the pixel group 52 for the dose measurement rows (the g10 row to the g12 row). In such a case, the control unit 36, via the readout unit, performs an AEC operation after selecting, as the dose measurement rows after the change, the pixel group 53 for the g4 row to the g6 row, for example, for which, between the g10 row to the g12 row, 3×m$_1$ rows are arranged. FIG. 5D is the image data after addition. In the image data after addition, one row of pixels 11' is arranged between the pixels 11' configured by the pixel group 54 and the pixels 11' configured by the pixel group 53. With the selection of the dose measurement row indicated by FIG. 5B, in a case of correction the pixel 11' at the position G4C2 after addition, it is only possible to correct by using the three pixels 11' at the positions G5C1 to G5C3 indicated by the range 55. In contrast, in the present embodiment, in a case of correcting the pixel 11' at the position G4C2 after addition, it is possible to use the signals of six pixels 11' at the positions G3C1 to G3C3 and G5C1 to G5C3 indicated by the range 56 in the correction. By this, even in a case of simultaneously reading out signals from a pixel group of n mutually adjacent rows, it is possible to change the pixels 11 used in AEC while suppressing an influence in accuracy of correcting a defective pixel when generating a radiation image.

In addition, similar to as described above, the readout unit may read out signals for detecting an incident dose from pixels 11 included in a plurality of pixel groups. In such a case, pixels 11 for at least n×m$_2$ rows (m$_2$ is a positive integer) are arranged between two pixel groups that are proximate to one another. Furthermore, for a case where a pixel group that includes a defective pixel 41 is preset as dose measurement rows, a moved pixel group is selected so that, with respect to the preset pixel group, n×m$_3$ rows (m$_3$ is a positive integer) are arranged therebetween. In such a case, the incident dose detection pixel 11 included in the pixel group after movement and the incident dose detection pixel 11 included in the pixel group that was preset may be pixels 11 that output signals to a common column signal line 16.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-029054, filed Feb. 21, 2018, which is hereby incorporated by reference herein in its entirety.

What is claimed is:

1. A radiation imaging apparatus comprising a plurality of pixels that configure a plurality of rows and a plurality of columns and are configured to obtain a radiation image; and a readout unit configured to readout signals from the plurality of pixels, wherein
the readout unit
reads out a signal from pixels simultaneously selected, out of the plurality of pixels, in accordance with a row selection line connected in common for each row, and
in a case where a first pixel for detecting an incident dose during capturing of a radiation image that is set from the plurality of pixels is a defective pixel, reads out a signal for detecting an incident dose from, instead of the first pixel, a second pixel selected from the plurality of pixels so that at least one row is arranged between the row that includes the first pixel and a row that includes the second pixel.

2. The radiation imaging apparatus according to claim 1, wherein the first pixel and the second pixel output signals to a common column signal line.

3. The radiation imaging apparatus according to claim 1, wherein
the readout unit further reads out a signal for detecting an incident dose from, out of the plurality of pixels, a third pixel set so that at least one row is arranged between the row that includes the first pixel and a row that includes the third pixel, and
the readout unit selects the second pixel so that at least one row is arranged between the row that includes the second pixel and the row that includes the third pixel.

4. The radiation imaging apparatus according to claim 3, wherein the second pixel and the third pixel output signals to a common column signal line.

5. The radiation imaging apparatus according to claim 1, wherein
the readout unit simultaneously reads out signals from a pixel group of n mutually adjacent rows (n is an integer that is greater than or equal to 2), and
selects the second pixel so that $n \times m_1$ ($m_1$ is a positive integer) rows are arranged between a pixel group that includes the first pixel and a pixel group that includes the second pixel.

6. The radiation imaging apparatus according to claim 5, wherein
the readout unit further reads out a signal for detecting an incident dose from, out of the plurality of pixels, a third pixel set as included in a pixel group separated from the pixel group that includes the first pixel by at least $n \times m_2$ ($m_2$ is a positive integer) rows, and
the readout unit selects the second pixel so that $n \times m_3$ ($m_3$ is a positive integer) rows are arranged between a pixel group that includes the second pixel and a pixel group that includes the third pixel.

7. The radiation imaging apparatus according to claim 1, wherein, if the second pixel is a defective pixel, the readout unit reads out a signal for detecting an incident dose from a fourth pixel included in the same row as the row of the second pixel.

8. The radiation imaging apparatus according to claim 1, wherein
the radiation imaging apparatus further includes a storage unit configured to store an arrangement of a defective pixel out of the plurality of pixels, and
if the first pixel is a defective pixel stored in the storage unit, the readout unit reads out a signal for detecting an incident dose from the second pixel.

9. The radiation imaging apparatus according to claim 8, wherein
the radiation imaging apparatus further includes a determination unit configured to determine whether or not each pixel of the plurality of pixels is a defective pixel, and
the determination unit causes the storage unit to store an arrangement of a pixel from the plurality of pixels determined to be a defective pixel.

10. A radiation imaging system, comprising:
a radiation imaging apparatus according to claim 1; and
a radiation source for emitting radiation onto the radiation imaging apparatus.

11. A control method for a radiation imaging apparatus comprising a plurality of pixels that configure a plurality of rows and a plurality of columns and are configured to obtain a radiation image; and a readout unit configured to readout signals from the plurality of pixels,
the readout unit simultaneously reading out signals for pixels, out of the plurality of pixels, connected to a common row selection line for each row, the method comprising:
determining whether a first pixel, set out of the plurality of pixels, for detecting an incident dose during capturing of the radiation image is a defective pixel; and if it is determined that the first pixel is a defective pixel,
reading out, by the readout unit, a signal for detecting an incident dose from, instead of the first pixel, a second pixel selected out of the plurality of pixels so that at least one row is arranged between a row that includes the first pixel and a row that includes the second pixel.

12. A non-transitory computer-readable storage medium storing a program for causing a computer to execute a control method for a radiation imaging apparatus comprising a plurality of pixels that configure a plurality of rows and a plurality of columns and are configured to obtain a radiation image; and a readout unit configured to readout signals from the plurality of pixels, the readout unit simultaneously reading out signals for pixels, out of the plurality of pixels, connected to a common row selection line for each row, the method comprising:

determining whether a first pixel, set out of the plurality of pixels, for detecting an incident dose during capturing of the radiation image is a defective pixel; and if it is determined that the first pixel is a defective pixel,
reading out, by the readout unit, a signal for detecting an incident dose from, instead of the first pixel, a second pixel selected out of the plurality of pixels so that at least one row is arranged between a row that includes the first pixel and a row that includes the second pixel.

* * * * *